US007113951B2

(12) United States Patent
Ashida et al.

(10) Patent No.: US 7,113,951 B2
(45) Date of Patent: Sep. 26, 2006

(54) METHOD AND SYSTEM FOR DETECTING TABLES TO BE MODIFIED

(75) Inventors: Hitoshi Ashida, Kawasaki (JP);
Mitsuhiko Yoshimura, Tokyo (JP);
Norifumi Nishikawa, Machida (JP);
Masashi Tsuchida, Machida (JP)

(73) Assignee: Hitachi, Ltd., Tokyo (JP)

( * ) Notice: Subject to any disclaimer, the term of this patent is extended or adjusted under 35 U.S.C. 154(b) by 587 days.

(21) Appl. No.: 10/345,260

(22) Filed: Jan. 16, 2003

(65) Prior Publication Data
US 2004/0002983 A1 Jan. 1, 2004

(30) Foreign Application Priority Data
Jun. 26, 2002 (JP) ............................. 2002-185449

(51) Int. Cl.
*G06F 17/00* (2006.01)
(52) U.S. Cl. .............................. 707/100; 707/2; 707/3; 707/4; 707/8; 707/10; 707/102; 707/200
(58) Field of Classification Search .............. 707/1–10, 707/100, 101–103 R, 104.1, 202, 200, 203
See application file for complete search history.

(56) References Cited

U.S. PATENT DOCUMENTS

| 5,717,924 | A | * | 2/1998 | Kawai | ........................ | 707/102 |
| 5,724,575 | A | * | 3/1998 | Hoover et al. | ................. | 707/10 |
| 5,870,743 | A | * | 2/1999 | Cohen et al. | ................... | 707/8 |
| 5,930,799 | A | * | 7/1999 | Tamano et al. | ............. | 707/102 |
| 6,161,103 | A | * | 12/2000 | Rauer et al. | .................... | 707/4 |
| 6,484,179 | B1 | * | 11/2002 | Roccaforte | ................... | 707/102 |
| 6,714,935 | B1 | * | 3/2004 | Delo | ........................... | 707/101 |
| 6,847,973 | B1 | * | 1/2005 | Griffin et al. | ............... | 707/101 |

OTHER PUBLICATIONS

Bonifati et al.; Dseigning Data Marts for Data Warehouses; ACM vol. 10, No. 4, Oct. 2001, pp. 452-483.*
Tolkin et al.; Aggregation Everywhere: Data reduction and transformation in the Phoenix dada Warehouse; ACM 1999, pp. 79-86.*
Buchner et al.; Discovering Internet Marketing Intelligence through Online Analytical Web Usage Mining; Sigmod Record, vol. 27, Dec. 1998, pp. 54-61.*
Sena et al.; Intellegence systems: a sociotechnical system perspective; ACM 1999, pp. 86-93.*
Eick et al.; Visualizing multi-dimensional data; AM 200, pp. 61-67.*

(Continued)

*Primary Examiner*—Shahid Alam
*Assistant Examiner*—Fred I. Ehichioya
(74) *Attorney, Agent, or Firm*—Mattingly, Stanger, Malur & Brundidge, P.C.

(57) ABSTRACT

In an MD schema definition modifying process for specifying tables to be modified in terms of addition of columns or the like when modification such as addition of a dimension is applied to an MD schema in a BI system having a fixed model such as a data model, tables to be modified in terms of addition of columns or the like are specified on the basis of information of modification such as addition of the dimension to the MD schema. In an extraction process of modification candidate tables, all combinations of tables and columns to be modified in terms of addition of columns or the like are output. In a decision process of modification target tables, a combination of tables to be modified can be output.

12 Claims, 6 Drawing Sheets

OTHER PUBLICATIONS

Markl et al.; Improving OLAP performance by multidimensional hierarchical clustering; IEEE 1999, pp. 165-177.*

Teorey et al.; A Logical Design methodology for Relational Databases Using the Extended Entity-Relationship Model; ACM 1986, pp. 197-222.*

Hurtado et al.; Updating OLAP Dimensions; ACM 1999, pp. 60-66.*

Agrawal et al.; Automatic Subspace Clustering of High Dimensional Data Mining Applications; ACM 1998, pp. 94-105.*

Chandra et al.; Data Distribution Support on Distributed Shared Memory Multiprocessors; ACM 1997, pp. 334-345.*

Hasan et al.; Approaches to the Development of Multi-Dimensional Databases: Lessons from Four Case Studies; The Data Base for Advances in Information Systems 2000 vol. 31, No. 3, pp. 10-23.*

Yocca Michael, Obtaining Record Counts; SQL Server Magazine, 1999, pp. 1-4.*

Oracle, Database Concepts, 1996/2002, Oracle, Oracle 9i 2(9.2), pp. 1-51.*

E. Thomsen, et al., Microsoft OLAP solutions, John Wiley & Sons, Inc., 1999, pp. 1-3.

M. Whitehorn, et al., Business Intelligence: The IBM Solution, Springer, 1999, pp. 10-11.

IBM StartNow Solutions for e-business, 2002, pp. 1-3.

Oracle9i Warehouse Builder iDS 2.0, 2002 pp. 1-5.

* cited by examiner

METHOD AND SYSTEM FOR DETECTING TABLES TO BE MODIFIED

BACKGROUND OF THE INVENTION

The present invention relates to a technique for aiding customization of an analysis system. Particularly, it relates to a method for listing tables having columns to be added, deleted or modified from a relational database when a dimension is added, deleted or modified in an analysis schema of a multidimensional database (MDB).

Computer systems, magnetic cards and IC cards have become popular in the general public in recent years, so that information systems (data warehouses) for storing and managing customer's attribute data such as names, addresses, etc. and purchase history have been able to be constructed by house cards in wide business categories such as department stores, specialty stores, household electrical appliances discount stores, supermarkets, etc. Business Intelligence Solutions using the constructed data warehouses for planning corporate strategy have attracted a great deal of public attention recently.

Business Intelligence is a general term of applications and techniques for aiding better decision-making so that collected, stored and analyzed data can be used by business persons. Business Intelligence application software includes decision-making system, inquiry, reporting, on-line analytical processing (OLAP), statistical analysis, prediction, and data mining. OLAP has been described in E. Thomsen et al., Microsoft OLAP solutions, John Wiley & Sons, Inc., 1999, pp. 1–3.

As described in M. Whitehorn et al., Business Intelligence: The IBM Solution, Springer, 1999, pp. 10–11, Business Intelligence application software is known as a combination of a relational database (RDB) and a multidirectional database (MDB) or OLAP. In OLAP, the structure of the multidimensional database (MDB) is described by a multidimensional schema (MD schema).

There is a growing tendency to shorten the periods required for constructing these information systems. To shorten the constructing periods, the following techniques are known.

One is provision of packages classified by industry or business activity. For example, IBM StartNow Solutions for e-business, 2002, pp. 1–3, integrally provide hardware, software, analysis model and introduction-aid service classified by industry, specialized in Customer Relationship Management (CRM). (StartNow Solutions for e-business is a registered trademark of IBM.)

RedBrick Warehouse provided by Infocom is a database exclusively used for constructing a data warehouse. It provides a tool called Red Brick Warehouse Administrator for aiding design and construction of a data warehouse. Red Brick Warehouse Administrator provides GUI for defining the relationship among RDB tables constituting a data warehouse and GUI for making a rough estimate of required disk capacity. (RedBrick Warehouse and Red Brick Warehouse Administrator are registered trademarks of Infocom)

Oracle9i Warehouse Builder iDS 2.0, 2002, pp. 1–5 has disclosed Oracle Warehouse Builder (OWB) for designing, mounting and managing a data warehouse. Oracle Warehouse Builder (OWB) is a registered trademark of Oracle Corporation. When OWB is used, RDB tables, MD schemata, Extraction, Transformation and Loading (ETL) jobs can be designed by GUI.

SUMMARY OF THE INVENTION

An object of the present invention is to provide a method used in a data warehouse and a BI system using a relational database (RDB, see FIG. 1) and a multidimensional database (MDB, see FIG. 1) in combination for listing tables having columns to be added, deleted or modified from the relational database when a new dimension is added to an analysis system or an MD schema mounted by the multidimensional database.

Another object of the present invention is to provide a method which can respond to the number of tables to be modified in accordance with modification of a schema generated on the table side even in the case where a large number of tables are generated sequentially in a database system.

To achieve the foregoing objects of the present invention, in a method of automatically detecting modification target tables according to the present invention, files to be modified in an MD schema and methods for modifying the files are listed by a modification process of MD schema definition to thereby specify tables having columns to be added or loaded tables in a relational database. The term "loaded" herein used means "converted into data structure visible in RDB tables and read into a schema of a multidimensional database (MDB)". Then, tables to be modified are traced back in data-loading order on the basis of table relation information having description of processing among tables by an extraction process of modification candidate tables to thereby list all combinations of modification candidate tables.

Then, a combination of tables having the minimized total number of records to be modified is selected from the all combinations of modification candidate tables by a decision process of modification target tables.

DETAILED DESCRIPTION OF THE EMBODIMENTS

An embodiment of the present invention will be described with reference to the drawings.

Figure 1:
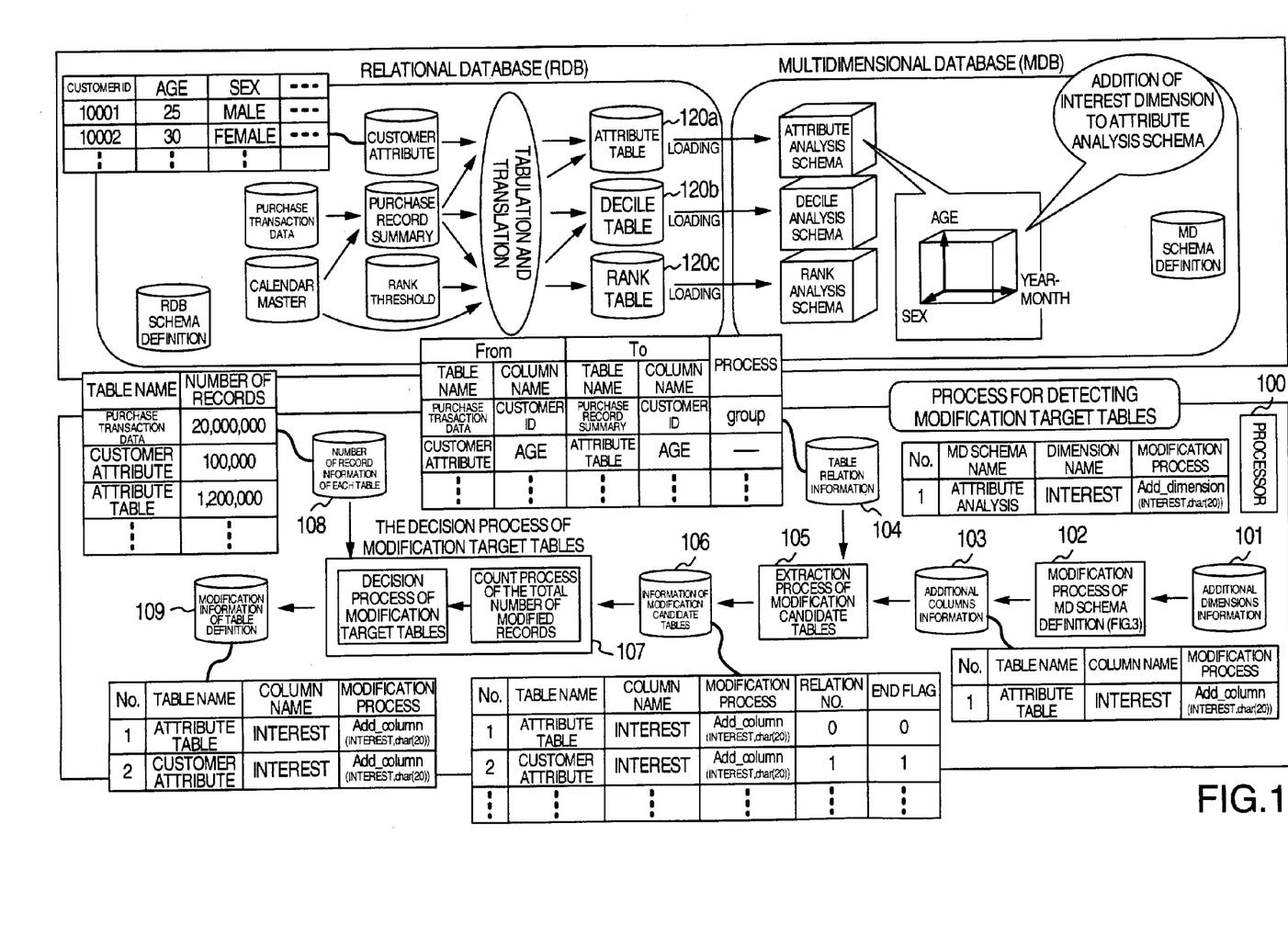
FIG. 1 is a configuration diagram of an analysis system as a subject of the present invention and a flow chart showing a process according to the present invention.

FIG. 1 shows an analysis system according to this embodiment, a process for detecting modification target tables in the present invention, and a flow of data therebetween.

In this embodiment, when a new dimension is added to a specific MD schema in an analysis system using a relational database and a multidimensional database in combination, places and processes required for modifying MD schema and RDB schema definition files are listed. The dimension to be added to the schema corresponds to columns to be added to the relational database which will be described later (see the reference numerals 101, 102 and 103 in FIG. 1).

This embodiment has the following processes.

1) Modification Process of MD Schema Definition 102:

A processor 100 receives additional dimensions information 101 as an input signal for specifying a dimension added to an MD schema, modifies MD schema definition files and outputs additional columns information 103 for definition files of RDB tables to be loaded to the MD schema to which the dimension needs to be added.

2) Extraction Process of Modification Candidate Tables 105:

The processor 100 receives the additional columns information 103 and table relation information 104 in which processing among tables up to generation of tables loaded to an MD schema from specification tables, master tables or the like is written. Then, the processor 100 lists all combinations of modification candidate tables by tracing back data-giving tables, that is, generation source tables table by table from modification target tables. Thus, the processor 100 outputs information of modification candidate tables 106.

3) Decision Process of Modification Target Tables 107:

The processor 100 receives the information of modification candidate tables 106 and information of the number of records of each table 108, counts the number of records in each combination of modification candidate tables and outputs a combination of tables having the smallest number of records as modification information of table definition 109.

Figure 2:
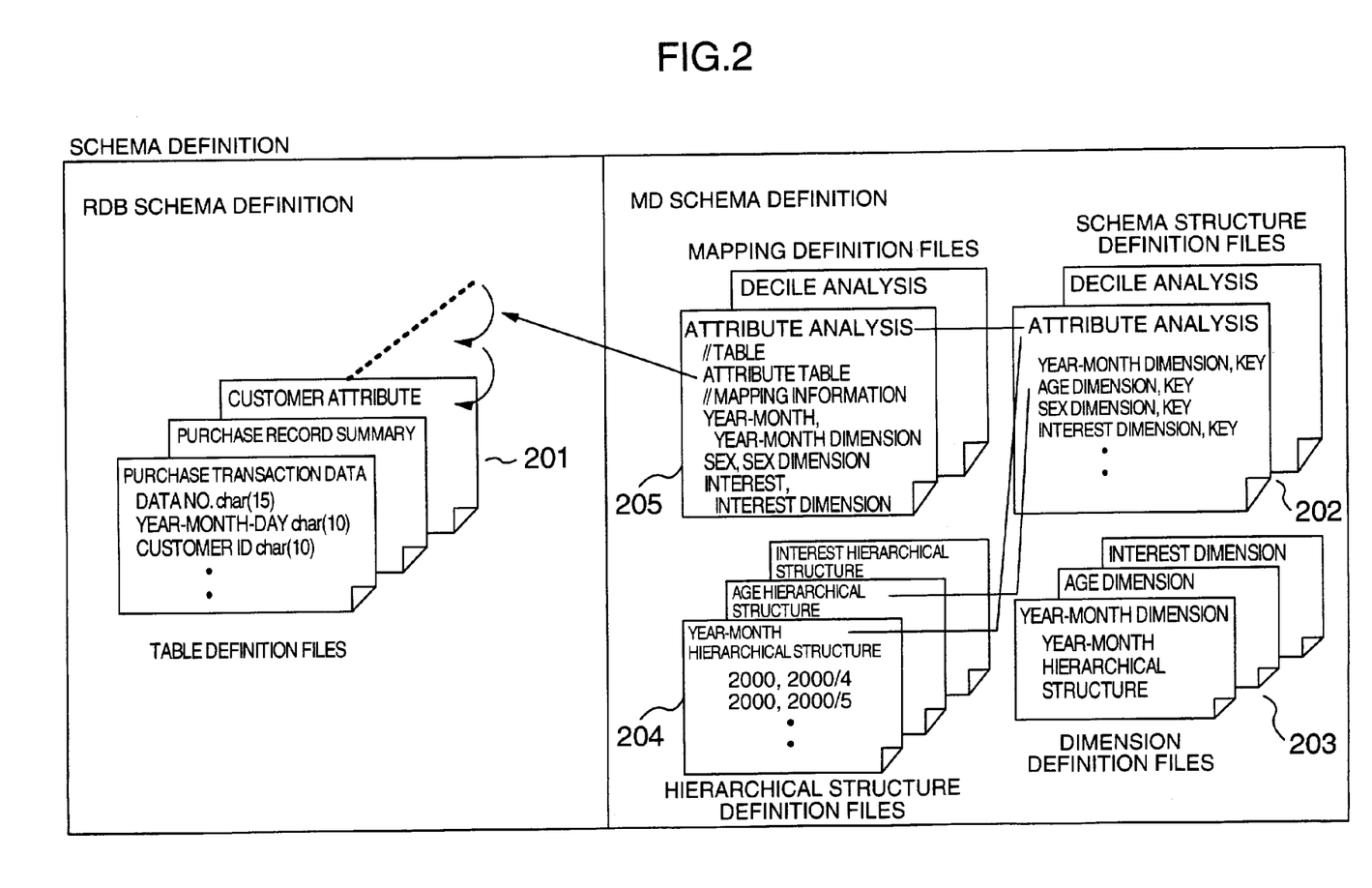
FIG. 2 is a configuration diagram of definition information of schemata constituting the analysis system as a subject of the present invention.

The analysis system shown in FIG. 1 is defined by definition files as shown in FIG. 2. A portion implemented in a relational database (RDB) and a portion implemented in a multidimensional database (MDB) are different from each other in definition method. When a new dimension is added to an MD schema, table definition files 201, schema structure definition files 202, dimension definition files 203, hierarchical structure definition files 204 and mapping definition files 205 as shown in FIG. 2 are modified or added. The present invention aims at specifying files to be modified in these files and processes required for modification.

MDB schema definition has the schema structure definition files 202, the dimension definition files 203, the hierarchical structure definition files 204 and the mapping definition files 205.

Dimensions constituting MD schemata are defined in the schema structure definition files 202. One file per MD schema is provided as the schema structure definition file 202. The name of the MD schema is described in the first line. The names and attributes of the dimensions constituting the MD schema are described in the second line et seq. The dimensions are classified into key dimensions and analysis dimensions by the dimension attributes. For example, in FIG. 2, MD schema attribute analysis has a year-month dimension, an age dimension, a sex dimension, an interest dimension, etc.

The name of a hierarchical structure corresponding to each dimension is defined in each of the dimension definition files 203. One file per dimension is provided as the dimension definition file 203. The name of a dimension is described in the first line of each file, and the name of a hierarchical structure is described in the second line.

Specific constituent members of a hierarchical structure are defined in each of the hierarchical structure definition files 204. The constituent members of a hierarchical structure are referred to as "members". The value of a dimension takes the value of any one of the members defined thus. The name of a hierarchical structure is described in the first line of each hierarchical structure definition file 204, and members constituting the hierarchical structure are described in the second line et seq., that is, all members including the lowest-rank members are described in the second line et seq. The lowest-rank members are described together with all parent members thereof. For example, the year-month hierarchical structure shown in FIG. 2 has two ranks, in which "2000" is a parent member for "2000/4" and "2000/5".

That is, dimensions constituting a schema are described in each of the schema structure definition files 202. Members constituting a hierarchical structure are defined in each of the hierarchical structure definition files 204. Correspondence between each of dimensions constituting a schema and a hierarchical structure is defined in each of the dimension definition files 203. Accordingly, MD schemata can be defined by the schema structure definition files 202, the dimension definition files 203 and the hierarchical structure definition files 204.

A table loaded to an MD schema, and relations between columns of the table and dimensions of the MD schema are defined in each of the mapping definition files 205. One file per MD schema is provided as the mapping definition file 205. In the example shown in FIG. 2, the name of an MD schema is written in the first line, the name of a loaded table is written in the third line, and correspondence between columns of the loaded table and dimensions of the MD schema are written in the fifth line et seq.

RDB schema definition is written in table definition files 201. One file per table is provided as the table definition file 201. As shown in FIG. 2, the name of a table is written in the first line, and information of columns constituting the table is written in the second line et seq. Lines corresponds to columns, so that the name of a column and the type of data are paired in one line.

Definition of a table written in a mapping definition file 205 is always included in any one of the table definition files.

In the analysis system shown in FIG. 1, the process of detecting modification target tables according to the present invention will be described by taking, as an example, the case where "Interest" is added as a key dimension to an attribute analysis schema implemented in a multidimensional database.

In the process of detecting modification target tables according to the present invention, tables having columns to be added are listed from tables implemented in a relational database in order to ensure consistency when an axis or dimension is added to an MD schema. If there are two or more combinations of tables to be added, a combination of tables selected from all the combinations of tables are listed so that the total number of records in the selected combination of tables to be modified is minimized, that is, the disk capacity or time required for modification is minimized.

Processes constituting the process of detecting modification target tables will be described below.

A modification process of MD schema definition includes deletion of a dimension from an MD schema, modification of a dimension, and addition of a dimension to an MD schema.

In response to a request to add a dimension to an attribute analysis schema, in the modification process of MD schema definition 102, the dimension designated in additional dimensions information 101 is added to a schema structure definition file 202 which is schema definition information, and a dimension definition file 203 and a hierarchical structure definition file 204 relevant to the designated dimension are generated. Further, information of relation between the added dimension and columns of tables 120 is added to a mapping definition file 205 of a schema to which the dimension is to be added. Further, information concerning columns to be added to tables or loaded tables giving data to the MD schema is output as additional columns information 103. The term "loaded tables" means tables from which data are read into the MDB, as shown in FIG. 1.

The name of an MD schema and the name of a dimension to be added to the MD schema are written in the additional dimensions information 101. As shown in FIG. 1, the additional dimensions information 101 has a "No." column, an "MD Schema Name" column, a "Dimension Name" column, and a "Modification Process" column. For example, Add_dimension (Interest, char (20)) which is a modification process shown in FIG. 1 indicates that an interest dimension is to be added to an MD schema and that each of members of "Interest" is of a char type constituted by 20 characters at maximum.

The additional columns information 103 has a "No." column, a "Table Name" column, a "Column Name" column, and a "Modification Process" column. Like the additional dimensions information 101, the names of columns of the additional columns information 103 are written in the first line, and data are written in the second line et seq. The additional columns information 103 shown in FIG. 1 means that a processed column having char type data constituted by 20 characters at maximum is to be added to an attribute table 120a.

Figure 3:
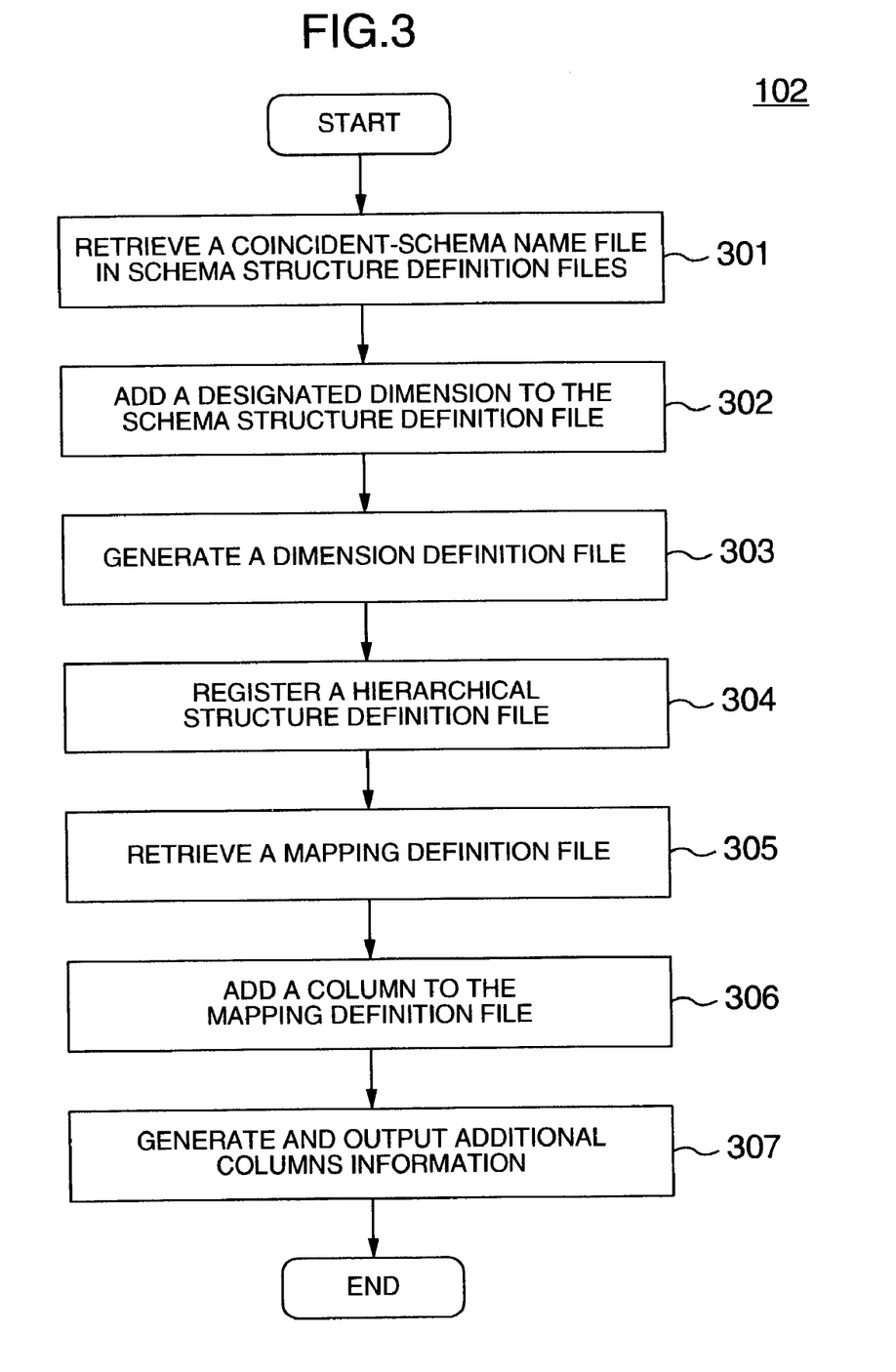
FIG. 3 is a flow chart showing a modification process of MD schema definition.

FIG. 3 is a flow chart showing the modification process of MD schema definition 102 by the processor 100.

In step 301, a file in which the MD schema name written in the first line coincides with the MD schema name designated in the additional dimensions information 101 is retrieved from the schema structure definition files 202.

In step 302, a dimension designated in the additional dimensions information 101 is added to the retrieved schema structure definition file 202. Here, the name of the dimension is obtained by addition of the term "dimension" to the dimension name designated in the additional dimensions information 101. When, for example, an interest dimension is added to attribute analysis, the term "interest dimension, key" is added to the schema structure definition file of attribute analysis, as shown in FIG. 2. Because the data type of "interest" is char type in the modification process of the additional dimensions information 101, judgment is made that the interest dimension is a key dimension.

In step 303, a dimension definition file 202 concerning the dimension designated in the additional dimensions information 101 is generated. Here, the name of the dimension is the same as the dimension name added to the schema structure definition file 202. The name of a hierarchical structure is obtained by removing the term "dimension" from the dimension name and adding the term "hierarchical structure" thereto.

In step 304, a hierarchical structure definition file 204 of the hierarchical structure designated in the newly generated dimension definition file 202 is generated. Assume that a hierarchical structure definition file 204 having a format as shown in FIG. 2 is prepared for the newly added interest dimension.

In step 305, a file in which the MD schema name written in the first line coincides with the MD schema name designated in the additional dimensions information 101 is retrieved from the mapping definition files 205.

In step 306, the dimension designated in the additional dimensions information 101 is added to the retrieved mapping definition file. On this occasion, the column name of a table or a loaded table 120 and the dimension name paired with the column name are stored in the mapping definition file 205. The column name of the table or the loaded table is equal to the dimension name written in the additional dimensions information 101.

In step 307, additional columns information 103 is generated on the basis of the mapping definition file retrieved by the step 306. The additional columns information 103 has a "No." column, a "Table Name" column, a "Column Name" column, and a "Modification Process" column. No. is a number for specifying a record. Integers 1, 2, 3, . . . are put in ascending order in the "No." column. Table Name is the name of a table having a column to be added. The names of loaded tables in the mapping definition file 205 retrieved by the step 306 are put in the "Table Name" column. The names of columns added by the step 306 are put in the "Column Name" column of the additional columns information 103. Add_column is set in the "Modification Process" column. The argument for the modification process of the additional dimensions information 101 is put in parentheses.

The extraction process of modification candidate tables 105 will be described. In the extraction process of modification candidate tables 105, all combinations of tables having columns to be added are listed by referring to the table relation information 104 on the basis of the additional columns information 103 output from the modification process of MD schema definition 102. For example, all the combinations of tables are output as "No. 1, attribute table, interest, . . . " in the second line and "No. 2, customer attribute, interest, . . . " in the third line in the information of modification candidate tables 106, as will be described later.

As shown in FIG. 1, the table relation information 104 indicating table generation relation among tables prepared in the RDB has a "From" column, a "To" column, and a "Process" column. The "From" column is divided into two columns, that is, "Table Name" column and "Column Name" column. Similarly, the "To" column is also divided into two columns, that is, "Table Name" column and "Column Name" column. That is, the field of "Table Name", "Column Name" and "Process" is provided in the first and second lines, and data are stored in the third line et seq. Data in "Table Name" and "Column Name" in the "From" column are subjected to the process designated in the same record to thereby generate data in "Table Name" and "Column Name" in the "To" column. For example, the record in the third line of the table relation information 104 provides the definition that the column "Customer ID" of the table "Purchase Record Summary" is generated by application of the "group" process to the column "Customer ID" of the table "Purchase Transaction Data". Here, the term "group" means collecting identical records of "Customer ID" into one.

The information of modification candidate tables 106 has the field of "Table Name", "Column Name", etc. in the first line, and data in the second line et seq. The columns of the information of modification candidate tables 106 are obtained by addition of the "Relation No." column and the "End Flag" column to the columns of the additional columns information 103. Like the additional columns information 103, each record indicates addition of a column to a table. Here, the term "Relation No." is modification process No. as a cause of modification in the information of modification candidate tables 106 (see the table 101). The "End Flag" column indicates whether the modification of one table causes modification of another table or not. When the modification of one table causes modification of another table, the value "0" is set in the "End Flag" column. When the modification of one table does not cause modification of another table, the value "1" is set in the "End Flag" column.

Figure 4:
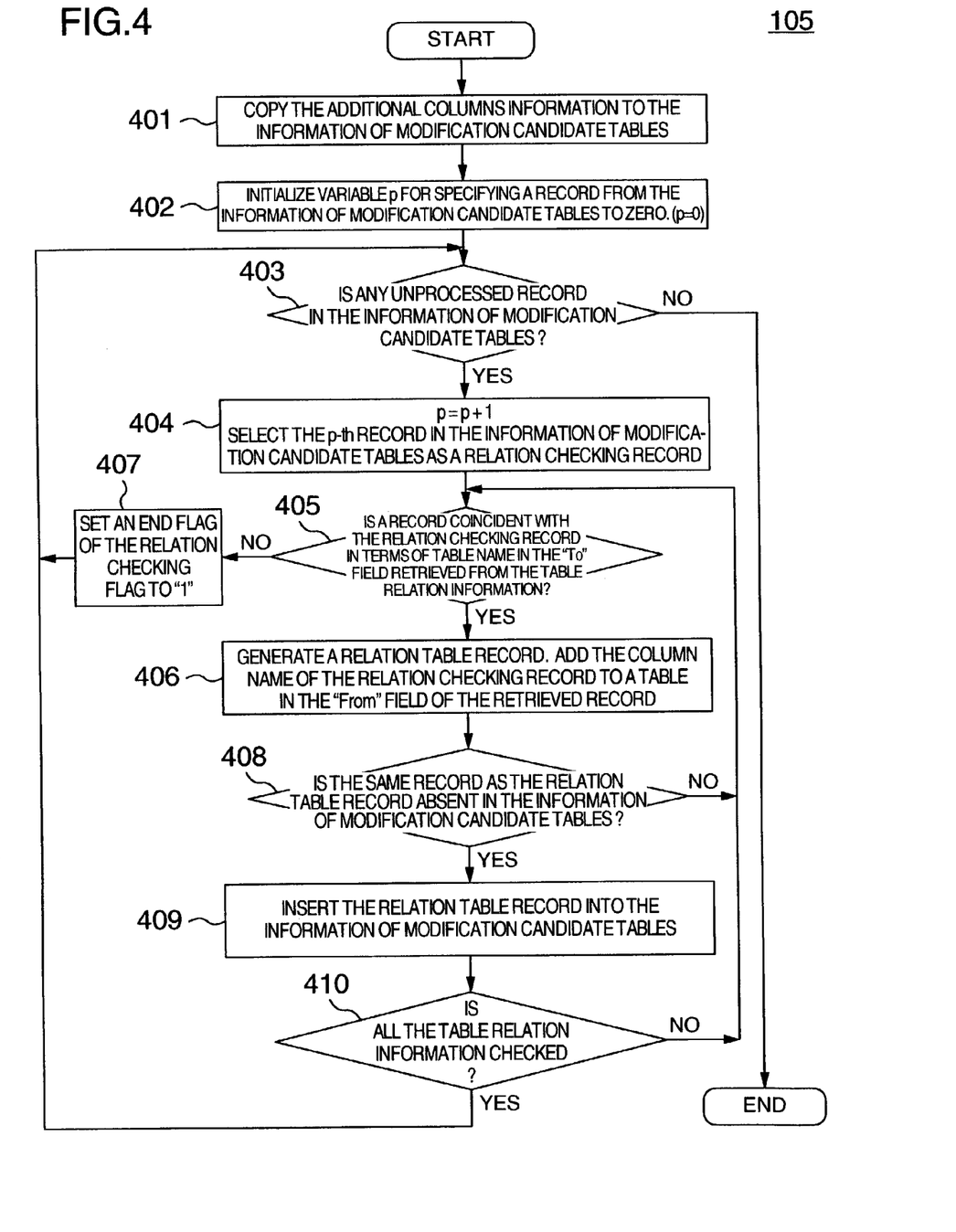
FIG. 4 is a flow chart showing an extraction process of modification candidate tables.

FIG. 4 is a flow chart showing the extraction process of modification candidate tables 105. Description of the process flow will be made below.

In step 401, as described above, a record of the additional columns information 103 is copied to a corresponding column of the information of modification candidate tables 106 (see No. 1 in the table 106). Both the relation No. and the end flag are initialized to zero.

In step 402, variable p for specifying a record in the information of modification candidate tables 106 is initialized to zero.

In step 403, checking is made as to whether a record unprocessed in step 404 et seq. is present in the records of the information of modification candidate tables 106 or not. If all records have been already processed in the step 404 et seq., the extraction process is terminated. If not so, the situation of the extraction process goes to the step 404.

In step 404, the variable p is incremented by "1" and the p-th record is selected as a relation checking record. Assume now that the record "No.=1, Table Name=Attribute Table, Column Name=Interest, Modification Process=Add_column (Interest, char(20)), Relation No.=0, End Flag=0" is selected as a relation checking record by way of example.

In step 405, a record coincident with the relation checking record in terms of Table Name in the "To" field is retrieved from the table relation information 104. When a coincident record is retrieved, the situation of the extraction process goes to step 406. When no coincident record is retrieved, the situation of the extraction process goes to step 407. In this example, because the second record of the table relation information 104 is retrieved, the situation of the extraction process goes to step 406.

In step 406, a relation table record is generated. Here, the term "relation table record" means addition of the column name of the relation checking record to a table designated in the "From" field of the retrieved record. This is a candidate record to be input to the information of modification candidate tables 106. The record has Table Name, Column Name and Modification Process. In this example, the relation table record is the aforementioned "No. 2, Customer Attribute, Interest, Add_column (Interest, char(20))". The relation is represented by the arrow moving from the "Customer Attribute" table to the attribute table 120a as shown in FIG. 1, that is the relation of table generation. Relation among tables is based on the fact that at least one portion of the table is generated or loaded sequentially.

In step 408, checking is made as to whether the same record as the relation table record is present in the information of modification candidate tables 106 or not. When no record is present, the situation of the extraction process goes to step 409. When the record is found, the situation of the extraction process goes back to the step 405.

In step 409, the relation table record is added to the information of modification candidate tables 106. Because the relation No. is modification process No. as a cause of modification in this example, the No. of the relation checking record is set as the relation No. The end flag is set to zero. Integers of 1, 2, 3, . . . are set in ascending order in the "No." column. In this example, the added record is "No. 2, Customer Attribute, Interest, Add_column (Interest, char (20)), 1, 0". In this case, the end flag takes "0" as a default value but will be updated to "1" after the following step.

In step 410, the selected relation checking record is used as a key for checking whether all records in the table relation information have been already retrieved or not. When all records have been already retrieved, the situation of the extraction process goes back to the step 403. When all records have been not retrieved yet, the situation of the extraction process goes back to the step 405. Assume now that all records in the table relation information have been already retrieved while the selected relation checking record is used as a key. In this case, the situation of the extraction process goes back to the step 403. Because the record of No.=2 added by the step 409 is present, the situation of the extraction process goes to the step 404 and this record is selected by the step 404. Because a decision in the step 405 is made that no record of the table name "Customer Attribute" in the "To" column is present in the table relation information 104, that is, no table having data to be loaded to the "Customer Attribute" table shown in FIG. 1 is present, the situation of the extraction process goes to step 407.

In step 407, the value of the "End Flag" column of the relation checking record is set to "1". In this example, the relation checking record is updated to "No. 2, Customer Attribute, Interest, Add_column (Interest, char(20)), 1, 1".

Next, the decision process of modification target tables 107 will be described. In the decision process of modification target tables 107, only information for specifying required minimum modification is extracted from the information of modification candidate tables 106 and output as modification information of table definition 109. The information of modification candidate tables 106 may contain two or more combinations of tables having table definition to be modified. When the following selection is made, only one combination of tables to be modified at required minimum can be stored in the modification information of table definition 109.

The total number of records in tables to be modified is used as a scheme for selecting the combination of tables. A combination of tables to be modified are selected so that the total number of records in the tables can be minimized. Minimization of the total number of records in tables to be modified will mean minimization of the newly required disk capacity.

Figure 5:
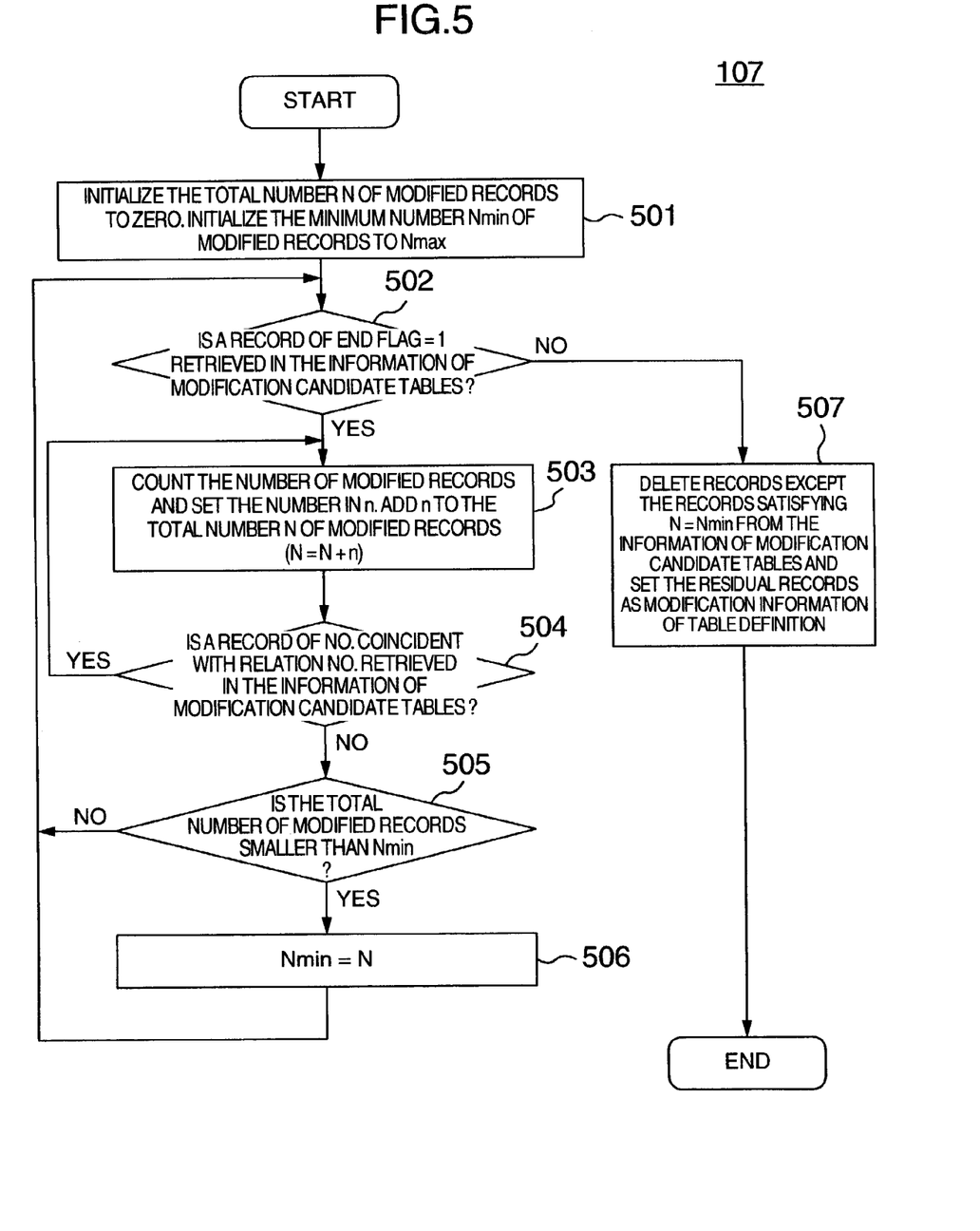
FIG. 5 is a flow chart showing a decision process of modification target tables.

FIG. 5 is a flow chart showing the decision process of modification target tables 107.

In step 501, the processor 100 initializes the total number N of modified records to zero and initializes the minimum number Nmin of modified records to Nmax. The total number N of modified records is the sum of numbers of records in a series of tables relevant to records in the additional columns information 103. Nmin is the minimum value of the total number of modified records. Nmax is the value obtained by addition of "1" to the total number of records in all tables in the information of the number of records of each table 108. Assume now that Nmin=Nmax=30,000,000 is set by way of example.

In step 502, a record having the end flag value as "1" is retrieved from the information of modification candidate tables 106. When a record is found, the situation of the decision process goes to step 503. When no record is found, the situation of the decision process goes to step 507. In this example, the record of No.=2 is retrieved and the situation of the decision process goes to step 503.

In step 503, the number of records in tables retrieved by the step 502 or 504 is counted by referring to the information of the number of records of each table 108. As a result, the counted number is stored in n. The number n is added to the total number N of modified records. In this example, n and N are both 1,200,000.

In step 504, a record of No. coincident with the relation No. of the record in which the number n of modified records is counted in the step 503 is retrieved from the information of modification candidate tables 106. When a record is retrieved, the situation of the decision process goes back to the step 503. When the relation No. is zero, the situation of the decision process goes to step 505. In this example, because the record of No.=1 is retrieved, the situation of the decision process goes back to the step 503. In the step 503, n=100,000 is set and N is set as follows.

$$N=1,200,000+100,000=1,300,000$$

When the situation of the decision process goes to the step 504 again, the relation No. is zero and the situation of the decision process goes to step 505.

In step 505, verification is made as to whether the total number N of modified records is smaller than Nmin or not. That is, verification is made as to whether the total number of records in a combination of tables currently checked is smaller than the total number of records in any one of combinations of tables having already checked. When the total number N of modified records is smaller than Nmin, the situation of the decision process goes to step 506. When the total number N is not smaller than Nmin, the situation of the decision process goes back to the step 502 and a new combination of tables are checked. Because N=1,300,000 and Nmin=3,000,000 are set, Nmin=1,300,000 is set.

Because the default value of Nmin is Nmax, when the step 505 is executed first, the situation of the decision process always goes to step 506 and the value of Nmin is updated to N.

In step 507, records except the combination of tables decided so that the total number N of modified records is minimized are deleted from the information of modification candidate tables 106 and the residual records are output as modification information of table definition 109.

This embodiment may be modified as follows and carried out.

Firstly, when a dimension in an MD schema is to be deleted, tables having columns to be deleted are listed from a data model implemented in a relational database in order to ensure consistency.

The information of the dimension to be deleted is written in the same format as that of the additional dimensions information 101. When, for example, an interest dimension is to be deleted, "Drop_dimension (Interest)" is written in the "Modification Process" column. A process for specifying tables having columns to be deleted in the data model implemented in the database is substantially the same as the detection process of modification target tables described above in the previous embodiment. The extraction process of modification candidate tables 105 is, however, modified as follows.

In step 405, a record coincident with the relation checking record in terms of table name and column name in the "To" field is retrieved from the table relation information 104.

In step 406, the table name and column name in the "From" field of the retrieved record is set as a relation table record.

Figure 6:
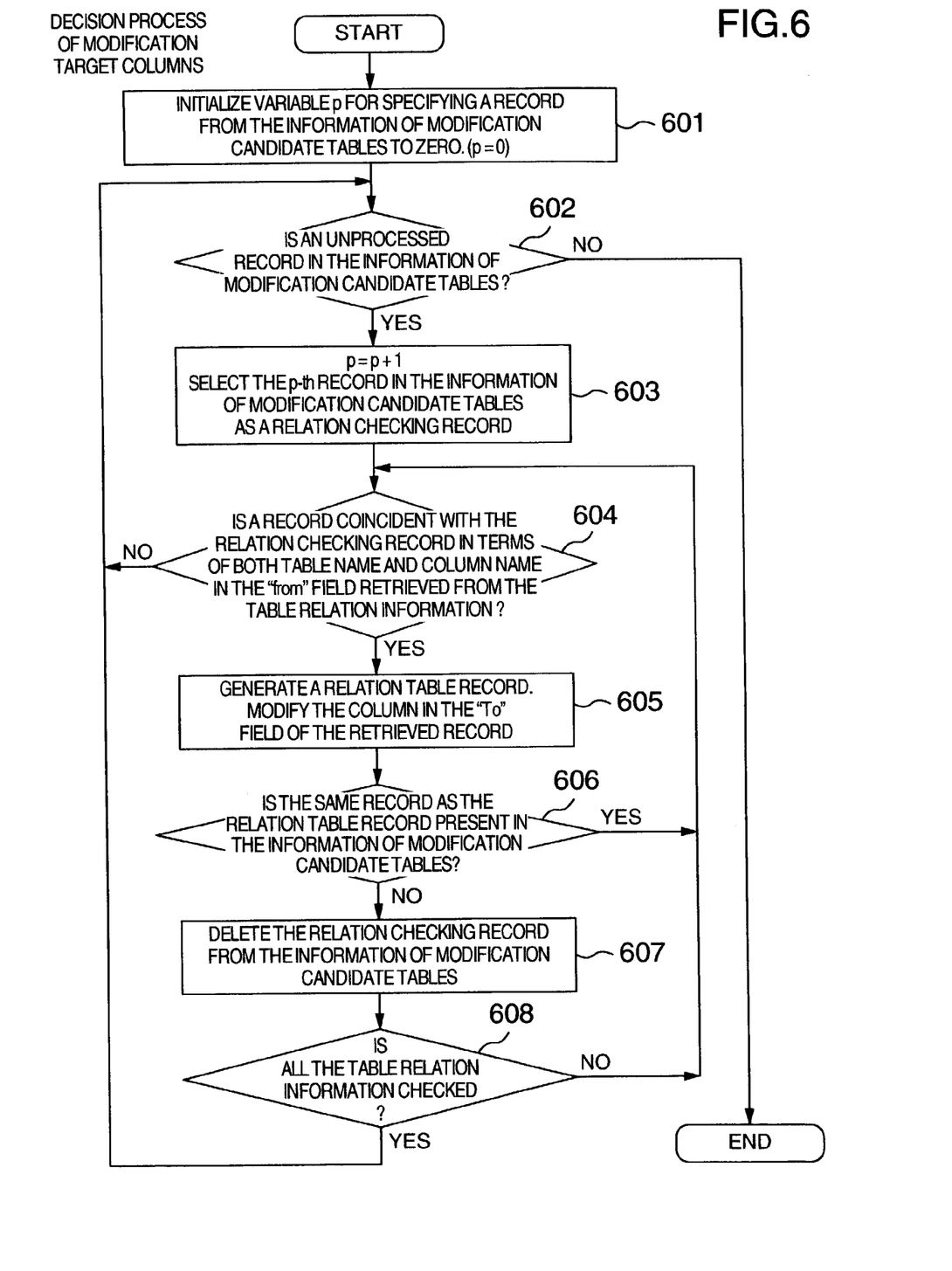
FIG. 6 is a flow chart showing a decision process of modification target columns.

When a column is to be deleted, a decision process of modification target columns shown in FIG. 6 is executed after the extraction process of modification candidate tables 105 is executed. In the decision process of modification target columns, checking is made as to whether the column to be deleted is a generation source of a column of a table as a generation source of another MD schema. When the column to be deleted is a generation source of a column of a table as a generation source of another MD schema, the column is not deleted. The flow chart shown in FIG. 6 will be described below.

In step 601, variable p for specifying a record from the information of modification candidate tables is initialized to zero.

In step 602, checking is made as to whether a record unprocessed in step 603 et seq. is present in the records of the information of modification candidate tables or not. When all records have been already processed by the step 603 et seq., the decision process is terminated. When all records have been not processed yet, the situation of the decision process goes to step 603.

In step 603, the variable p in the information of modification candidate tables is incremented by "1" and the p-th record is selected as a relation checking record. Assume now that the record "No.=2, Table Name=Customer Attribute, Column Name=Interest, Modification Process=Drop_column (Interest), Relation No.=1, End Flag=1" is selected as a relation checking record by way of example.

In step 604, a record coincident with the relation checking record in terms of table name and column name in the "From" field is retrieved from the table relation information 104. When a coincident record is retrieved, the situation of the decision process goes to step 605. When no coincident record is retrieved, the situation of the decision process goes back to the step 602. In this example, because the second record in the table relation information 104 is retrieved, the situation of the decision process goes to step 605.

In step 605, a relation table record is generated. The relation table record indicates that a process of modifying the relation checking record is applied to a column in the "To" field of the retrieved record. The record has a table name, a column name, and a modification process. In this example, "Customer Attribute, Interest, Drop_column (Interest)" is the relation table record.

In step 606, checking is made as to whether a record identical to the relation table record is present in the information of modification candidate tables 106 or not. When no record is present, the situation of the decision process goes to step 607. When a record is present, the situation of the decision process goes back to the step 604.

In step 607, the relation checking record is deleted from the information of modification candidate tables 106.

In step 608, the selected relation checking record is used as a key for checking whether all records in the table relation information have been already retrieved or not. When all records have been already retrieved, the situation of the decision process goes back to the step 602. When all records haven been not retrieved yet, the situation of the decision process goes back to the step 604.

When a dimension is to be deleted, the No., table name, column name and modification process in the information of modification candidate tables 106 are copied to the modification information of table definition 109 without execution of the decision process of modification target tables 107.

Secondly, when the name of a dimension in an MD schema is to be changed, tables and columns to be modified in terms of name are listed from a data model implemented in a relational database in order to ensure consistency.

Information of the dimension to be changed in terms of name is written in the same format as that of the additional dimensions information 101. When, for example, the name of the interest dimension is changed to "Chief Interest", the dimension name is "Chief Interest" and the modification process is Change_name (Chief Interest). A process for specifying tables and columns to be modified in terms of column name in the data model implemented in the database is substantially the same as the process of detecting modification target tables as described above in the previous embodiment. The extraction process of modification candidate tables 105 is, however, modified as follows.

In step 405, a record identical to the relation checking record in terms of table name and column name in the "To" field is retrieved from the table relation information.

In step 406, the column name in the "From" field of the retrieved record is changed to the column name of the relation checking record and the retrieved record is set as a relation table record.

At the time of changing the name of the dimension, the decision process of modification target columns shown in FIG. 6 is executed after the extraction process of modification candidate tables 105 is executed in the same manner as in the first modification of the embodiment. In this case, verification is made as to whether the column to be modified in terms of name is inconsistent with the generation of another table or not. When inconsistency occurs, the column name of a corresponding table is changed.

In the decision process of modification target columns, only the step 607 is changed to the step of "adding the relation table record to the information of modification candidate tables".

The No., table name, column name and modification process in the information of modification candidate tables 106 are copied to the modification information of table definition 109 in the same manner as in the first modification of the embodiment without execution of the decision process of modification target tables 107.

Thirdly, when the maximum number of characters in each of the lowest-rank members of a hierarchical structure relevant to a dimension in an MD schema is to be changed, tables and columns to be modified in terms of column record length are listed from a data model implemented in a relational database in order to ensure consistency.

Information of the dimension for changing the maximum number of characters is written in the same format as that of the additional dimensions information 101. When, for example, the maximum number of characters in each of the lowest-rank members of the interest dimension is changed to 32, the modification process is set as Change_length (32). A process for specifying tables and columns to be modified in terms of record length in the data model implemented in the database is the same as in the second modification of the embodiment.

A program for carrying out the aforementioned method according to the present invention may be stored in a storage medium which can be read by a computer. In this case, the program can be read into a memory and executed for carrying out the method according to the present invention.

When a new dimension is added to or deleted from a schema which is one of constituent members of the system in a data warehouse and a BI system having a fixed model such as a data model according to the present invention, tables having columns to be added or deleted can be listed from a relational database. When the name of the dimension of an MD schema is to be changed, tables and columns to be modified in terms of column name can be listed from the relational database. When the maximum number of characters in each of the lowest-rank members of a hierarchical structure relevant to a dimension in a schema is to be changed, tables and columns to be modified in terms of column record length can be listed from the relational database. Accordingly, the smallest number of table records can be modified on the basis of information of table definition by using a tool for designing respective tables.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A table detection method implemented by a computer for giving table name information of a combination of tables to be modified, said table detection method comprising the steps of:

collecting combinations of tables relevant to a dimension from a plurality of tables at least partially sequentially generated in a database in accordance with addition of the dimension on the basis of a table of table relation information having a plurality of records indicating relation and sequence of generation among the plurality of tables in response to a request to add the dimension to an analysis schema generated based on the plurality of tables;

storing the collected combinations of tables in information of modification candidate tables;

counting a number of records in each of the combinations of tables, selecting a combination of tables having a smallest number of records, and outputting names of the combination of tables having a smallest number of records, wherein said storing step includes the step of:

preparing a table of table relation information in which table names of two continuous tables in said plurality of sequentially generated tables and column names are provided as pairs in a "From" column and a "To" column in one record.

2. A method according to claim 1, wherein said storing step includes the step of preparing said information of modification candidate tables having columns indicating said dimension, said combinations of tables relevant to said dimension, the additional process, contents of the additional process, and end of sequential relation among tables respectively, said columns being provided in each record.

3. A method according to claim 2, wherein the column indicating the end of relation has a flag indicating the end of relation when there is no record having a name of a relevant table in the "To" column of the table of table relation information.

4. A table detection apparatus for giving table name information of a combination of tables to be modified, comprising:

a processor;

a table of table relation information having a plurality of records indicating relation and sequence of generation among a plurality of tables at least partially sequentially generated in a database in response to a request to modify a dimension in an analysis schema generated on the basis of the plurality of tables; and information of modification candidate tables into which combinations of tables relevant to the dimension are collected from the plurality of tables in accordance with the modification of the dimension based on contents of the table of table relation information, wherein said processor counts a number of records in each of the combinations of candidate tables, selects a combination of tables having a minimum number of records, and outputs table names of the combination of tables having a minimum number of records, wherein said table of table relation information is formed so that table names of two continuous tables in said plurality of sequentially generated tables and column names are provided as pairs in a "From" column and a "To" column in one record.

5. An apparatus according to claim 4, wherein said information of modification candidate tables has columns indicating said dimension, said combinations of tables relevant to said dimension, the additional process, contents of the additional process, and end of sequential relation among tables respectively, said columns being provided in each record.

6. An apparatus according to claim 5, wherein the column indicating the end of relation has a flag indicating the end of relation when there is no record having a name of a relevant table in the "To" column of the table of table relation information.

7. A table detection program for giving table name information of a combination of tables to be modified, comprising:
 a computer code which can be read by a processor for carrying out the step of collecting combinations of tables relevant to a dimension from a plurality of tables at least partially sequentially generated in a database in accordance with addition of the dimension on the basis of a table of table relation information having a plurality of records indicating relation and sequence of generation among the plurality of tables in response to a request to add the dimension to an analysis schema generated based on the plurality of tables, and storing the collected combinations of tables in information of modification candidate tables; and
 a computer code which can be read by the processor for carrying out the step of counting a number of records in each of the combinations of tables, selecting a combination of tables having a smallest number of records, and outputting names of the combination of tables having a smallest number of records,
 wherein said storing step includes the step of:
 preparing a table of table relation information in which table names of two continuous tables in said plurality of sequentially generated tables and column names are provided as pairs in a "From" column and a "To" column in one record.

8. A program according to claim 7, wherein said storing step includes the step of preparing said information of modification candidate tables having columns indicating said dimension, said combinations of tables relevant to said dimension, the additional process, contents of the additional process, and end of sequential relation among tables respectively, said columns being provided in each record.

9. A program according to claim 8, wherein the column indicating the end of relation has a flag indicating the end of relation when there is no record having a name of a relevant table in the "To" column of the table of table relation information.

10. A medium for storing a table detection program for giving table name information of a combination of tables to be modified, comprising:
 a computer code which can be read by a processor for carrying out the step of collecting combinations of tables relevant to a dimension from a plurality of tables at least partially sequentially generated in a database in accordance with addition of the dimension on the basis of a table of table relation information having a plurality of records indicating relation and sequence of generation among the plurality of tables in response to a request to add the dimension to an analysis schema generated based on the plurality of tables, and storing the collected combinations of tables in information of modification candidate tables; and
 a computer code which can be read by the processor for carrying out the step of counting a number of records in each of the combinations of tables, selecting a combination of tables having a smallest number of records, and outputting names of the combination of tables having a smallest number of records,
 wherein said storing step includes the step of:
 preparing the table of table relation information in which table names of two continuous tables in said plurality of sequentially generated tables and column names are provided as pairs in a "From" column and a "To" column in one record.

11. A medium according to claim 10, wherein said storing step includes the step of preparing said information of modification candidate tables having columns indicating said dimension, said combinations of tables relevant to said dimension, the additional process, contents of the additional process, and end of sequential relation among tables respectively, said columns being provided in each record.

12. A medium according to claim 11, wherein the column indicating the end of relation has a flag indicating the end of relation when there is no record having a name of a relevant table in the "To" column of the table of table relation information.

* * * * *